3,659,007
STABILIZATION OF THERMALLY UNSTABLE
DIMETHYL TEREPHTHALATE
Edward H. Giambra, Wilmington, N.C., assignor to
Hercules Incorporated, Wilmington, Del.
No Drawing. Filed Oct. 23, 1969, Ser. No. 868,925
Int. Cl. C07c 69/82
U.S. Cl. 260—475 B                                13 Claims

ABSTRACT OF THE DISCLOSURE

Disclosed is the stabilization of thermally unstable dimethyl terephthalate with a stabilizing quantity of material selected from the group consisting of catechol and pyrogallol.

---

This invention is in the chemical arts. It has to do with that branch of organic chemistry pertaining to alcohol esters of aromatic dicarboxylic acids.

Dimethyl terephthalate is a well-known normally solid chemical of commercial importance. It is used in large quantities in the production of polyesters from which fibers and the like are made.

Recently, it has become common practice to ship and store dimethyl terephthalate in the molten state, that is, at temperatures above 140° C. In some instances, however, dimethyl terephthalate is unstable to the extent under such conditions its color and acidity tend to increase substantially. The problem to which this invention provides a solution is how to stabilize thermally unstable dimethyl terephthalate.

In summary, this invention comprises a thermally stable composition consisting essentially of thermally unstable dimethyl terephthalate and dispersed therein at a stabilizing concentration material selected from the group consisting of catechol and pyrogallol. In some embodiments of the composition of this invention the material comprises only catechol. In other embodiments it comprises only pyrogallol. In still other embodiments it comprises both catechol and pyrogallol.

The concentration of material selected from the group consisting of catechol and pyrogallol is in a wide range. However, in the case of catechol, when it alone is used, the concentration is generally in the range from about 0.02 to about 20 parts by weight per million parts by weight of dimethyl terephthalate and preferably in the range from about 0.02 to about 2 parts by weight per million parts by weight of the dimethyl terephthalate. In the case of pyrogallol, when it alone is used, its concentration is generally in the range from about 0.2 to about 20 parts by weight per million parts by weight of the dimethyl terephthalate, and preferably in the range from about 0.2 to about 1 part by weight per million parts by weight of the dimethyl terephthalate.

The composition of this invention is made by admixing the stabilizing material with the thermally unstable dimethyl terephthalate in the molten condition. The molten composition can be maintained in the molten condition until it is used, or it can be cooled until solid.

The composition is made by admixing the stabilizing material with the thermally unstable dimethyl terephthalate in the finely divided solid state. Subsequently, when the dimethyl terephthalate is melted the stabilizing material is incorporated in it.

The composition of this invention is made also by admixing the stabilizing material of this invention with a solution of the thermally unstable dimethyl terephthalate in a solvent preferably for both the dimethyl terephthalate and the stabilizing material. Preferably the stabilizing material when added to the solution is dissolved either in a mutual solvent or the same solvent. A preferred solvent for both the dimethyl terephthalate and the stabilizing material of this invention is methanol. After the stabilizing material has been dispersed in the solution of dimethyl terephthalate, the solvent is removed by evaporation or crystallization of the dimethyl terephthalate is effected. The crystalline product in the latter instance is one embodiment of the composition of this invention.

The efficacies of catechol and pyrogallol in stabilizing thermally unstable dimethyl terephthalate are demonstrated by the data presented in the folowing table. These data were taken in a standard thermal stability test on samples of thermally unstable dimethyl terephthalate with and without the additives identified in the table. The samples were made by admixing quantities (0.0030–0.0060 gram) of the additives into thermally unstable molten dimethyl terephthalate, stirring the resulting mixtures to assure homogeneity, freezing the mixtures, crushing the resulting solids into finely divided particles, and in each case, mixing well the solids thus obtained. Weighed quantities of these solid "concentrates" (additive concentrations were 20–40 parts by weight per million parts by weight of dimethyl terephthalate) were then admixed with weighed quantities of thermally unstable molten dimethyl terephthalate, and the procedure repeated to obtain the samples.

In the thermal stability test, the samples were aged for four hours at 175° C. and then the acid number and color number were ascertained by standard procedures.

TABLE

| Additive | Concentration (p.p.m.) | With additive Color | With additive Acid No. | Without additive Color | Without additive Acid No. |
|---|---|---|---|---|---|
| Catechol | 20 | 30 | 0.006 | 30 | 0.150 |
|  | 20 | 25 | 0.005 | 30 | 0.185 |
|  | 10 | 10 | 0.004 | 30 | 0.145 |
|  | 10 | 15 | 0.005 | 30 | 0.118 |
|  | 5 | 15 | 0.004 | 30 | 0.118 |
|  | 5 | 15 | 0.008 | 30 | 0.118 |
|  | 2.5 | 10 | 0.002 | 30 | 0.118 |
|  | 2.5 | 15 | 0.004 | 30 | 0.118 |
|  | 1 | <5 | 0.005 | 25 | 0.157 |
|  | 0.5 | <5 | 0.005 | 25 | 0.157 |
|  | 0.25 | <5 | 0.004 | 25 | 0.157 |
|  | 0.025 | <5 | 0.007 | 25 | 0.157 |
|  |  |  | 0.004 | 30 | 0.150 |
| Pyrogallol | 20 | <5 | 0.003 | 30 | 0.185 |
|  | 10 | (a) | 0.004 | 30 | 0.145 |
|  | 10 | (a) | 0.005 | 30 | 0.118 |
|  | 5 | (a) | 0.005 | 30 | 0.118 |
|  | 2.5 | (a) | 0.005 | 30 | 0.118 |
|  | 1.0 | (b) | 0.004 | 20 | 0.161 |
|  | 0.5 | 20 | 0.004 | 20 | 9.161 |
|  | 0.25 | 15 | 0.003 | 20 | 9.161 |
|  | 0.025 | 15 | 0.185 | 20 | 0.161 |
| Quinone | 20 | 10, 10 | 0.008, 0.007 | 15 | 0.35 |
|  | 5 | 30 | 0.40 | 15 | 0.35 |
|  | 1 | 20 | 0.40 | 15 | 0.35 |
|  | 0.5 | 25 | 0.28 | 15 | 0.35 |
| Technical hydroquinone | 2 | 5 | 0.006 | 10 | 0.09 |
|  | 1 | 5 | 0.007 | 10 | 0.09 |
|  | 0.5 |  | 0.17 | 25 | 0.44 |
|  | 0.5 |  | 0.18 | 20 | 0.36 |
| t-Butyl catechol | 5 | 20 | 0.004 | 20 | 0.12 |
|  | 1 | 5 | 0.004 | 20 | 0.12 |
|  | 0.5 | 5 | 0.014 | 20 | 0.12 |
| Butylated hydroxytoluene | 5 | <5 | 0.003 | 20 | 0.28 |
|  | 1 | <5 | 0.10 | 20 | 0.28 |
|  | 0.5 | 25 | 0.29 | 20 | 0.28 |
| Hydroxy dimethyl terephthalate | 20 | 25 | 0.21 | 20 | 0.28 |
|  | 5 | 30 | 0.28 | 20 | 0.28 |
|  | 1, 0.05 | 35–25 | 0.27 | 20 | 0.28 |
| Phenol | 20 | <5 | 0.006 |  |  |
|  | 5 | <5 | 0.007 |  |  |
|  | 1, 0.5 | 15, 20 | 0.16, 0.16 | 20 | 0.16 |
| Methyl salicylate | 10 | 15 | 0.12 | 25 | 9.17 |
|  | 5 | 10 | 0.13 | 25 | 0.17 |
|  | 1, 0.5 | 15, 15 | 0.13, 0.14 | 25 | 0.17 |

TABLE—Continued

| Additive | Concentration (p.p.m.) | With additive | | Without additive | |
|---|---|---|---|---|---|
| | | Color | Acid No. | Color | Acid No. |
| Toluhydroquinone | 2.0 | <5 | 0.004 | | |
| | 0.5 | 30 | 0.18 | | |
| Hydroquinone monomethyl ether | 2.0 | <5 | 0.004 | | |
| | 0.5 | 25 | 0.18 | | |
| 2,5-di-t-butyl hydroquinone | 2.0 | 15, 10 | 0.012, 0.006 | 25 | 0.19 |
| | 0.5 | 10, 5 | 0.024, 0.007 | 25 | 9.19 |
| Hydroquinone dimethyl ether | 2.0 | 25 | 0.12 | 25 | 0.19 |
| | 0.5 | 15 | 0.06 | 25 | 0.19 |
| Citric acid | 2.0 | 15 | 0.15 | 25 | 0.19 |
| | 0.5 | 15 | 0.08 | 25 | 9.19 |
| Triphenyl phosphite | 2.0 | <5 | 0.20 | | |
| | 0.5 | <5 | 0.18 | | |
| Primene JMT [t-(C$_{18-22}$)-alkyl amines product] | 5 | <5 | 0.009 | 10 | 0.012 |
| | 1 | 15 | 0.007 | 10 | 0.012 |
| Primene 81-R [t-(C$_{12-14}$)-alkyl amines product] | 5 | 15 | 0.13 | 10 | 0.012 |
| | 1 | 10 | 0.008 | 10 | 0.012 | a Pink. b Light Pink.

From these data it can be seen that catechol is effective in the range from about 0.02 to about 20 parts per million in stabilizing thermally unstable dimethyl terephthalate relative to acid number, and in the range from about 0.02 to about 2 parts per million in stabilizing thermally unstable dimethyl terephthalate relative to increase in color. Similarly, it can be seen that pyrogallol is effective in the range from about 0.2 to about 20 parts per million in stabilizing thermally unstable dimethyl terephthalate relative to acid number, and in the range from about 0.2 to about 1 part per million in stabilizing thermally unstable dimethyl terephthalate relative to color increase.

These data also show that catechol and pyrogallol, particularly catechol, at extremely low levels of concentration are substantially more effective in thermally stabilizing thermally unstable dimethyl terephthalate than other phenolic compounds and certain non-phenolic compounds known to have a stabilizing effect on other thermally unstable substances.

Thus, this invention provides a thermally stabilized dimethyl terephthalate composition.

Features of advantage of this invention are that catechol and pyrogallol are compatible with dimethyl terephthalate and are related in chemical structure to dimethyl terephthalate. Moreover, at least at their lower concentrations in the general concentration ranges above indicated, they do not interfere with the ester interchange reaction employed to make fiber grade polyesters from dimethyl terephthalate and ethylene glycol.

Other features advantages and specific embodiments of this invention will become readily apparent to those exercising ordinary skill in the art after reading the foregoing disclosures. Such specific embodiments are within the scope of this invention. Moreover, while specific embodiments of the composition of this invention have been described in considerable detail, variations and modifications of these embodiments can be made without departing from the spirit and scope of the invention as described and claimed.

The term "consisting essentially of" as used in this specification excludes any unrecited substance at a concentration sufficient to substantially adversely affect the essential properties and characteristics of the composition of matter being defined, while permitting the presence of one or more unrecited substances at concentrations insufficient to substantially adversely affect said essential properties and characteristics.

What I claim and desire to protect by Letters Patent is:

1. A thermally stable composition consisting essentially of thermally unstable dimethyl terephthalate and dispersed therein at a concentration in the range from about 0.02 to about 20 parts by weight per million parts by weight of said dimethyl terephthalate material selected from the group consisting of catechol and pyrogallol.

2. A composition according to claim 1, wherein said material consists essentially of catechol.

3. A composition according to claim 2, wherein said concentration is in a range from about 0.02 to about 2 parts by weight per million parts by weight of said dimethyl terephthalate.

4. A composition according to claim 1, wherein said material consists essentially of pyrogallol.

5. A composition according to claim 4, wherein said concentration is in a range from about 0.2 to about 1 part by weight per million parts by weight of said dimethyl terephthalate.

6. A process for thermally stabilizing thermally unstable dimethyl terephthalate, which comprises incorporating into said dimethyl terephthalate material selected from the group consisting of catechol and pyrogallol, the quantity of said material being in the range from about 0.2 to about 20 parts by weight per million parts by weight of said dimethyl terephthalate.

7. A process according to claim 6, wherein said material is incorporated into said dimethyl terephthalate by admixing it with said dimethyl terephthalate in the molten condition.

8. A process according to claim 6, wherein said material is incorporated into said dimethyl terephthalate by admixing it with said dimethyl terephthalate dissolved in a solvent.

9. A process according to claim 8, wherein said material is dissolved in a solvent.

10. A process according to claim 9, wherein the solvent in which said dimethyl terephthalate is dissolved is the same as the solvent in which said material is dissolved.

11. A process according to claim 10, wherein said solvent is methanol.

12. A process according to claim 11, wherein dimethyl terephthalate with said material incorporated in it is separated from substantially all solvent.

13. A process according to claim 12, wherein the dimethyl terephthalate with said material incorporated in it is separated from substantially all solvent by crystallization.

References Cited
UNITED STATES PATENTS 3,014,064  12/1961  Evenhuis et al. ____ 200—475 B
2,894,979   7/1959  Leach _____ 260—475 B LORRAINE A. WEINBERGER, Primary Examiner E. J. SKELLY, Assistant Examiner